United States Patent
Fujihara et al.

(10) Patent No.: US 9,511,949 B2
(45) Date of Patent: Dec. 6, 2016

(54) ARTICLE SORTING APPARATUS (71) Applicant: Kabushiki Kaisha Toshiba, Minato-ku (JP)

(72) Inventors: Hiroaki Fujihara, Kawasaki (JP); Yusuke Mitsuya, Yokohama (JP); Yukio Asari, Yokohama (JP); Kazuya Saimei, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/833,636

(22) Filed: Aug. 24, 2015

(65) Prior Publication Data

US 2016/0052722 A1    Feb. 25, 2016

(30) Foreign Application Priority Data

Aug. 25, 2014    (JP) ................... 2014-170780

(51) Int. Cl.
  *B65G 43/08*    (2006.01)
  *B65G 47/71*    (2006.01)
  *B65G 17/34*    (2006.01)

(52) U.S. Cl.
  CPC ............. *B65G 43/08* (2013.01); *B65G 17/345* (2013.01); *B65G 47/71* (2013.01); *B65G 2203/0208* (2013.01); *B65G 2203/0258* (2013.01)

(58) Field of Classification Search
  CPC ........ B65G 17/345; B65G 43/08; B65G 47/71
  USPC ............................ 198/358, 370.06
  See application file for complete search history.

(56) References Cited

U.S. PATENT DOCUMENTS

| 4,763,771 | A | * | 8/1988 | Geerts | B65G 17/345 |
| | | | | | 198/370.06 |
| 4,884,676 | A | * | 12/1989 | Suizu | B65G 17/345 |
| | | | | | 198/370.06 |
| 4,930,613 | A | * | 6/1990 | Okura | B65G 17/345 |
| | | | | | 198/370.06 |
| 5,294,004 | A | * | 3/1994 | Leverett | B07C 5/18 |
| | | | | | 177/145 |

(Continued)

FOREIGN PATENT DOCUMENTS

JP    7-30580    7/1995

OTHER PUBLICATIONS

U.S. Appl. No. 14/820,007, Aug. 6, 2015, Fujihara, et al.

*Primary Examiner* — William R Harp
(74) *Attorney, Agent, or Firm* — Oblon, McClelland, Maier & Neustadt, L.L.P.

(57) ABSTRACT

An article sorting apparatus includes a conveying path, a conveyer cell, a loading section, a sorting section and a control device. The conveyer cell includes a belt, a projecting portion and an actuator. The belt forms a setting surface on which an article is set. The projecting portion projects from a surface of the belt. The actuator drives the belt. The conveyer cell moves on the conveying path in a first conveying direction and conveys the article set on the setting surface in a second conveying direction orthogonal to the first conveying direction. The loading section transfers the article to the conveyer cell. The control device, when a size of the article is smaller than a predetermined size and when the loading section transfers the article to the setting surface, controls the actuator to drive the belt such that the projecting portion contacts a lower surface of the article.

12 Claims, 7 Drawing Sheets

(56) References Cited

U.S. PATENT DOCUMENTS

| | | | | |
|---|---|---|---|---|
| 5,588,520 A | * | 12/1996 | Affaticati | B61B 13/08 |
| | | | | 198/370.06 |
| 8,413,787 B2 | * | 4/2013 | Brouwer | B07C 3/06 |
| | | | | 198/370.01 |
| 2002/0017537 A1 | | 2/2002 | Barklin et al. | |
| 2014/0008178 A1 | * | 1/2014 | Guernsey | B65G 47/844 |
| | | | | 198/370.07 |

* cited by examiner

ARTICLE SORTING APPARATUS

CROSS-REFERENCE TO RELATED APPLICATION

This application is based upon and claims the benefit of priority from the prior Japanese Patent Application No. 2014-170780, filed on Aug. 25, 2014, the entire contents of which are incorporated herein by reference.

FIELD

An embodiment of the present invention relates to an article sorting apparatus.

BACKGROUND

There is conventionally a cross belt sorter which conveys a plurality of cells on a conveying path and transfers articles in a direction orthogonal to a conveying direction by using a belt mechanism provided to each of a plurality of cells. The cross belt sorter transfers an article to a shooter by transferring the article from an injector onto a belt of the belt mechanism of each cell and driving the belt when a cell to which the article has been transferred comes adjacent to the sorting destination shooter.

The cross belt sorter has a problem that, when transferring an article from the injector onto a belt of a desired cell fails and the article stays between the injector and the desired cell, it is difficult to adequately transfer and sort articles. An object of the present invention is to provide an article sorting apparatus which can adequately convey and sort articles.

DETAILED DESCRIPTION

An article sorting apparatus according to an embodiment includes a conveying path, a conveyer cell, a loading section, a sorting section and a control device. The conveyer cell includes a belt, a projecting portion and an actuator. The belt forms a setting surface on which an article is set. The projecting portion projects from a surface of the belt. The actuator drives the belt. The conveyer cell moves on the conveying path in a first conveying direction and conveys the article set on the setting surface in a second conveying direction orthogonal to the first conveying direction of the conveying path. The loading section transfers the article to the conveyer cell. The sorting section receives the article delivered from the conveyer cell. The control device, when a size of the article is smaller than a predetermined size and when the loading section transfers the article to the setting surface, controls the actuator to drive the belt such that the projecting portion contacts a lower surface of the article.

An article sorting apparatus according to the embodiment will be described below with reference to the drawings.

Figure 1:
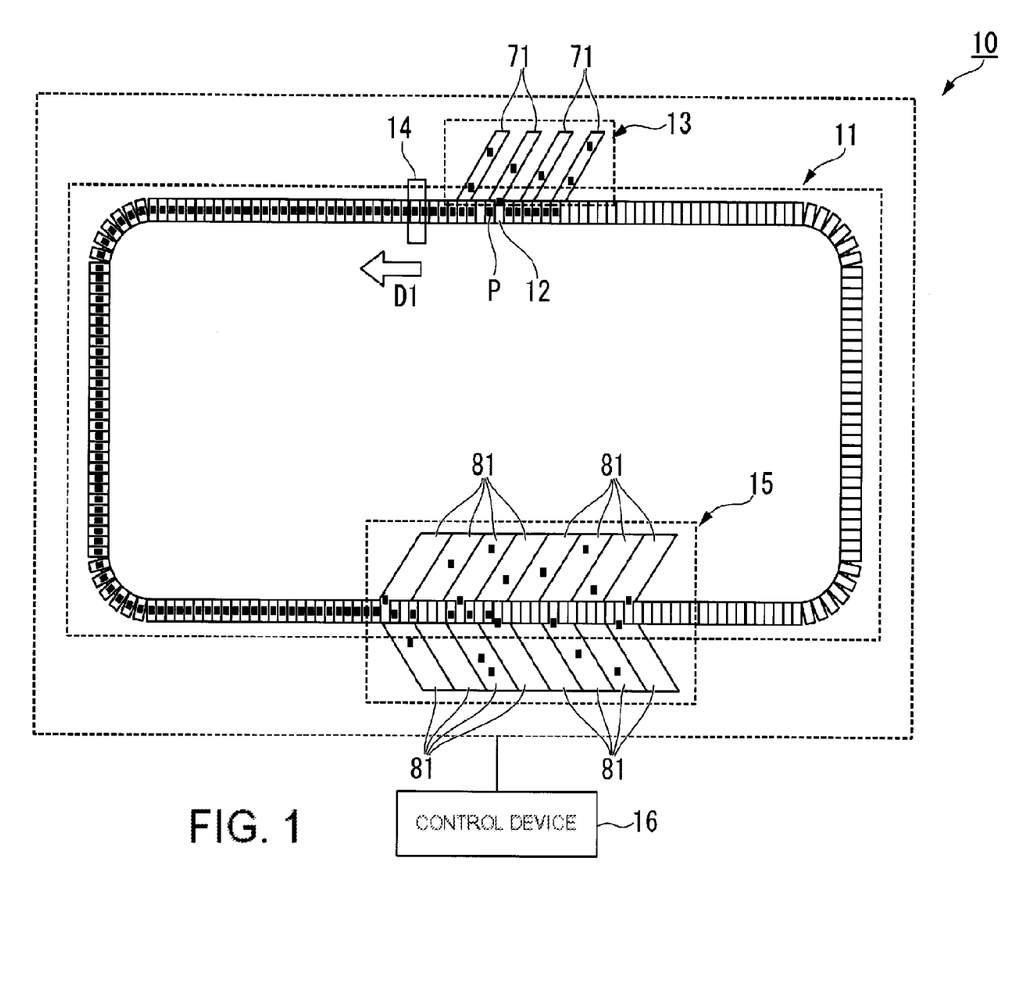
FIG. 1 is a plan view schematically illustrating a configuration of an article sorting apparatus according to an embodiment.

As illustrated in FIG. 1, the article sorting apparatus 10 according to the embodiment includes a conveying path 11, a plurality of conveyer cells 12, a loading section 13 provided next to the conveying path 11, an information obtaining device 14, a sorting section 15 and a control device 16 which integrally controls the article sorting apparatus 10.

The conveying path 11 forms a circling (circulating) path which guides each of the plurality of conveyer cells 12. The conveying path 11 sequentially guides each conveyer cell 12 on the circling (circulating) path to the loading section 13, the information obtaining device 14 and the sorting section 15 along a first conveying direction D1 (i.e., a counterclockwise direction when a paper sheet is seen from the above in FIG. 1).

Figure 2:
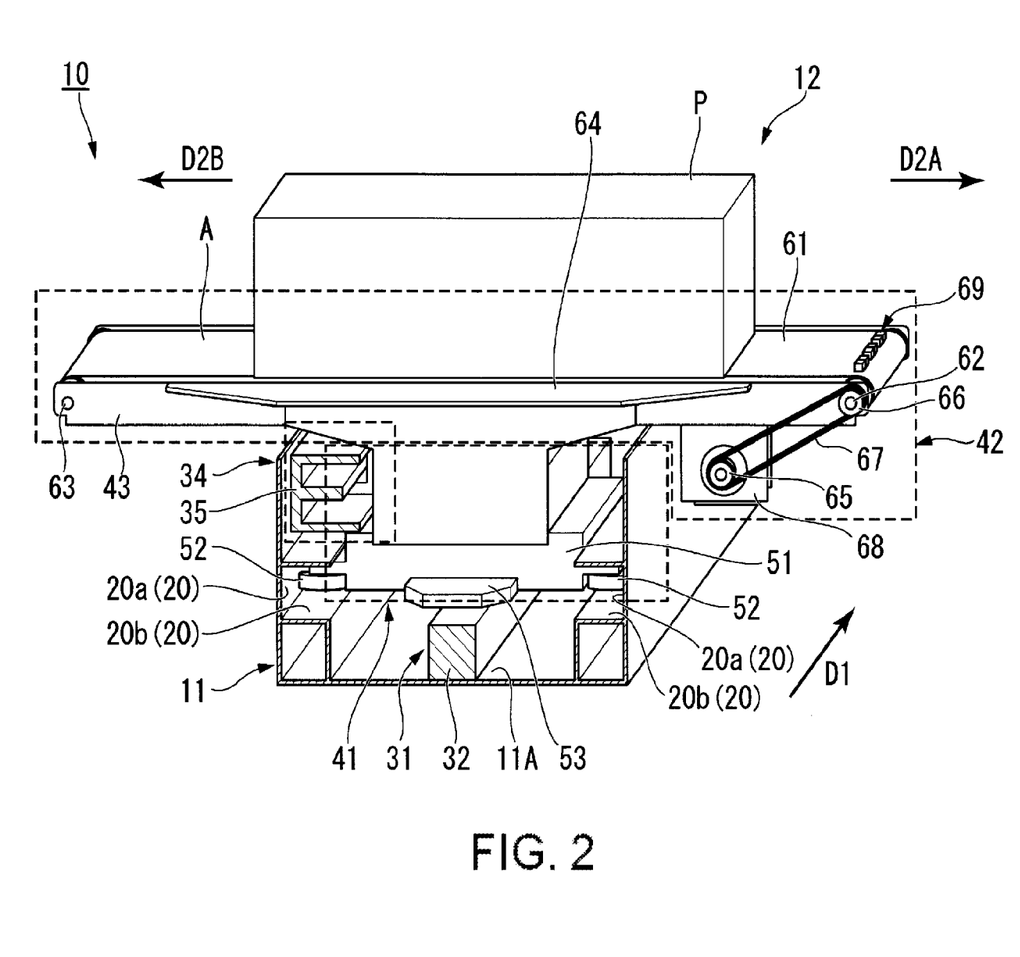
FIG. 2 is a perspective view schematically illustrating a configuration of a conveyer cell of the article sorting apparatus according to the embodiment.
Figure 3:
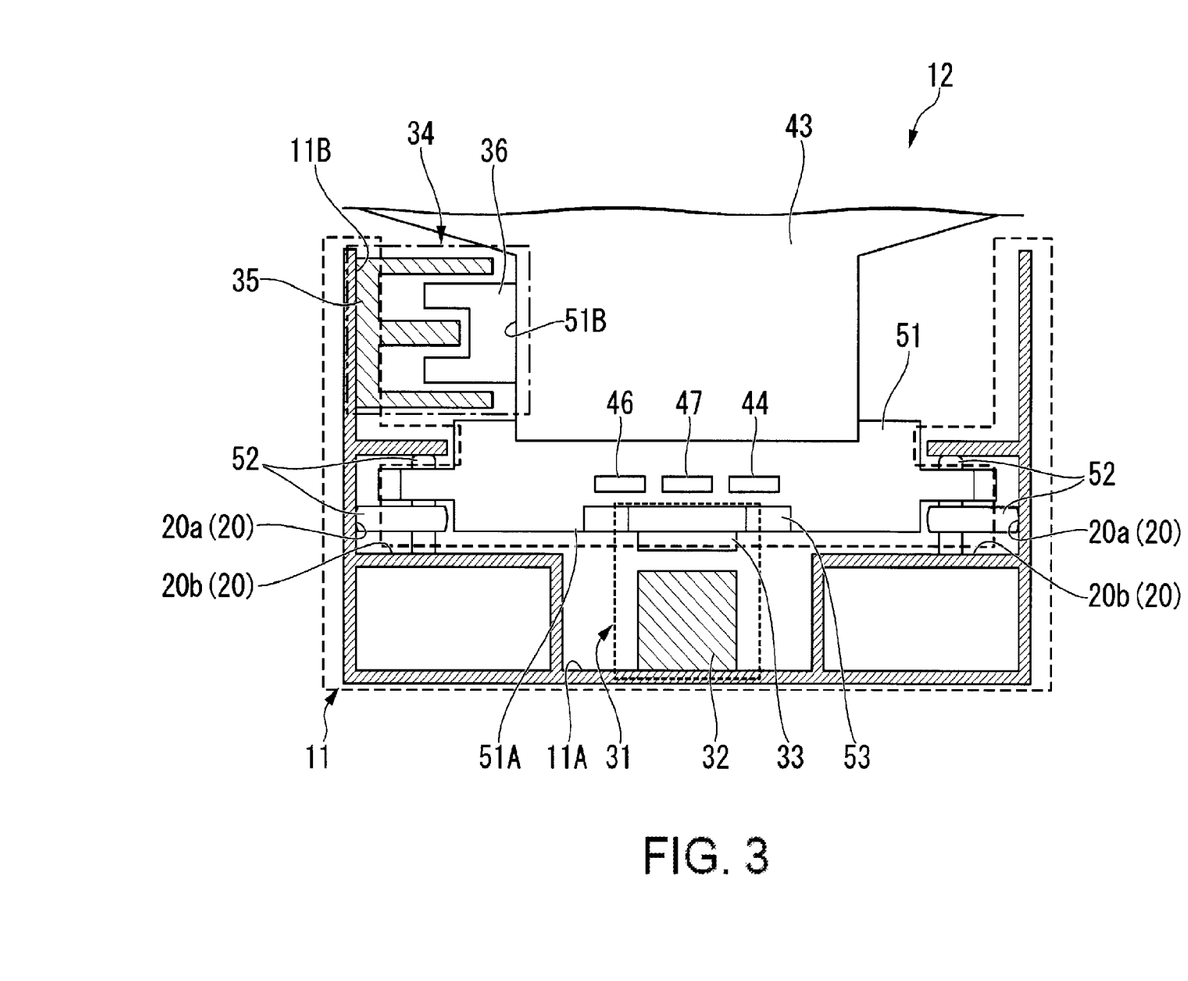
FIG. 3 is a sectional view schematically illustrating a configuration of part of the conveyer cell of the article sorting apparatus according to the embodiment.

As illustrated in FIGS. 2 and 3, the conveying path 11 includes a guide wall 20 (e.g. a first guide wall 20a and a second guide wall 20b) which contacts guide rollers 52 of each conveyer cell 12 described below to guide a course of the guide rollers 52.

The conveying path 11 and the plurality of conveyer cells 12 include linear synchronous motors 31 which drive each conveyer cell 12 on the conveying path 11. The linear synchronous motor 31 includes an electromagnetic coil 32 which is a stator provided in an entire region of the conveying path 11, and a permanent magnet array 33 as a movable element which is provided to each of a plurality of conveyer cells 12. The linear synchronous motor 31 generates a driving force (conveying force) of the first conveying direction D1 in the permanent magnet array 33 by a current flowing in the electromagnetic coil 32. The control device 16 controls a state of a current flowing in the electromagnetic coil 32, and the linear synchronous motor 31 conveys each conveyer cell 12 by a conveying force which works on the permanent magnet array 33 and at an arbitrary speed and acceleration.

The conveying path 11 and the plurality of conveyer cells 12 include a non-contact power feeder 34 which supplies power from the conveying path 11 to each conveyer cell 12. The non-contact power feeder 34 includes a primary coil 35 which is provided in an entire region of the conveying path 11, and a secondary coil 36 which is provided to each of a plurality of conveyer cells 12. The non-contact power feeder 34 supplies power from the conveying path 11 to each convey cell 12 by electromagnetic induction between the primary coil 35 and the secondary coil 36.

As illustrated in FIG. 1, the plurality of conveyer cells 12 which moves on the conveying path 11 is arranged in a row in the first conveying direction D1. The conveyer cells 12 which are adjacent in the first conveying direction D1 are connected with each other.

Each of the plurality of conveyer cells 12 includes a chassis unit 41, a cross belt mechanism 42 and a frame unit 43 which fixes the chassis unit 41 and the cross belt mechanism 42 as illustrated in FIG. 2, and includes a battery 44, a communication section 46 and a cell controller 47 as illustrated in FIG. 3.

The chassis unit 41 includes a chassis 51 which forms a base of all conveyer cells 12, two guide rollers 52 which are supported by the chassis 51, and a connecting mechanism 53.

As illustrated in FIG. 3, for example, at the chassis 51, the permanent magnet array 33 of the linear synchronous motor 31 is fixed to a lower surface 51A of the chassis 51 opposing to a bottom surface 11A of the conveying path 11. Thus, at the chassis 51, the permanent magnet array 33 is arranged to oppose to the electromagnetic coil 32 provided to the bottom surface 11A of the conveying path 11.

For example, at the chassis 51, the secondary coil 36 of the non-contact power feeder 34 is fixed to a side surface 51B of the chassis 51 opposing to an inner wall surface 11B of the conveying path 11. Thus, at the chassis 51, the secondary coil 36 is arranged to oppose to the primary coil 35 provided to the inner wall surface 11B of the conveying path 11.

Each of the two guide rollers 52 includes a rotation axis (not illustrated) supported by the chassis 51. Each guide roller 52 rotates around the rotation axis while coming into contact with the guide wall 20 (i.e. each of the first guide wall 20a and the second guide wall 20b) of the conveying path 11 when the conveyer cells 12 are conveyed on the conveying path 11. Thus, each guide roller 52 guides the conveyer cells 12 to a course guided by the guide wall 20 of the conveying path 11.

The connecting mechanism 53 is fixed to each of a front portion and a rear portion of the chassis 51. The connecting mechanism 53 of each conveyer cell 12 is connected with the connecting mechanism 53 of another conveyer cell 12 which is adjacent to each conveyer cell 12 in the first conveying direction D1 rotatably around at least the rotation axis of a vertical direction. Thus, the conveyer cells 12 which are adjacent in the first conveying direction D1 are connected by the mutual connecting mechanisms 53 without blocking mutual operations.

As illustrated in FIG. 2, the cross belt mechanism 42 is fixed to the chassis unit 41 by the frame unit 43 made of metal, for example. The cross belt mechanism 42 conveys a loaded article P in a second conveying direction orthogonal to the first conveying direction D1 (e.g. a first transferring direction D2A and a second transferring direction D2B which are directions opposite to each other). The first transferring direction D2A is, for example, a right direction of the conveyer cells 12 when a person faces the first conveying direction D1. The second transferring direction D2B is, for example, a left direction of the conveyer cells 12 when a person faces the first conveying direction D1.

The cross belt mechanism 42 includes a cross belt 61, a driving roller 62, a driven roller 63, a belt supporting plate 64, a motor side synchronous pulley 65, a roller side synchronous pulley 66, a timing belt 67 and a motor 68.

The cross belt 61 is, for example, a tubular endless belt formed as a flat belt. A surface of the cross belt 61 is covered by polyvinyl chloride, polyurethane or synthetic resin such as synthetic rubber. The cross belt 61 is stretched between the driving roller 62 and the driven roller 63. The cross belt 61 is rotated by a rotation driving force of the driving roller 62 to drive and rotate the driven roller 63. The driving roller 62 and the driven roller 63 are arranged in parallel to each other at predetermined interval in the horizontal direction of each conveyer cell 12 (i.e. the first transferring direction D2A and the second transferring direction D2B) when a person faces the first conveying direction D1.

Figure 4:
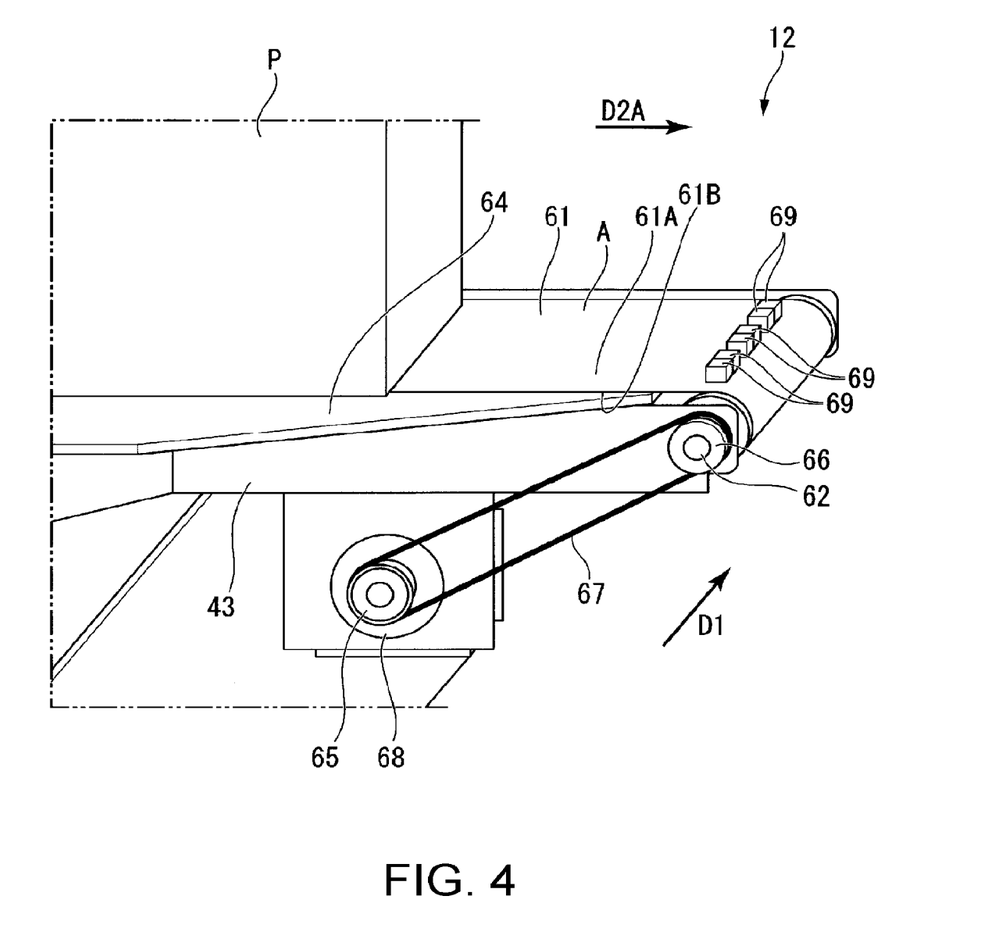
FIG. 4 is a perspective view schematically illustrating a configuration of part of the conveyer cell of the article sorting apparatus according to the embodiment.

As illustrated in FIG. 4, an upper surface of outer surfaces 61A of the cross belt 61 the normal direction of which is upward in the vertical direction forms a setting surface A on which the article P is set. The belt supporting plate 64 supports a site which is a back surface of the setting surface A which is one of inner surfaces 61B of the cross belt 61. Thus, the belt supporting plate 64 prevents the cross belt 61 from deflecting against weights of the cross belt 61 and the article P set on the setting surface A.

The cross belt 61 includes at least one projecting portion 69 which projects from the outer surface 61A. An external shape of the projecting portion 69 is formed in, for example, a bar shape. The projecting portion 69 is made of a material such as resin. The projecting portion 69 is fixed to the outer surface 61A of the cross belt 61 by way of adhesion, welding or fusing.

The projecting portion 69 is arranged at least one predetermined position in a longitudinal direction of the cross belt 61 (i.e., a direction orthogonal to a width direction) (such a position includes two predetermined positions set at predetermined interval in a length direction of the cross belt 61). At least one projecting portion 69 is continuously or discontinuously arranged over an entire region in the width direction of the cross belt 61 (i.e. a direction orthogonal to the second conveying direction) at a predetermined position in the longitudinal direction of the cross belt 61.

Each of the driving roller 62 and the driven roller 63 includes a rotation axis (not illustrated) supported by the frame unit 43. The rotation axis of each of the driving roller 62 and the driven roller 63 is arranged in parallel to the first conveying direction D1 at predetermined interval in the horizontal direction (i.e., the first transferring direction D2A and the second transferring direction D2B) when a person faces the first conveying direction D1.

The motor side synchronous pulley 65 is coaxially connected to the motor 68. The roller side synchronous pulley 66 is coaxially connected to the driving roller 62. The timing belt 67 is an endless toothed belt which is engaged with the motor side synchronous pulley 65 and the roller side synchronous pulley 66. The timing belt 67 is stretched between the motor side synchronous pulley 65 and the roller side synchronous pulley 66. The timing belt 67 is rotated by a rotation driving force of the motor side synchronous pulley 65 to drive and rotate the roller side synchronous pulley 66.

The motor 68 is a servomotor controlled by the cell controller 47. The motor 68 is coaxially connected to the motor side synchronous pulley 65. The motor 68 generates a rotation driving force by using power supplied from the non-contact power feeder 34 to drive and rotate the motor side synchronous pulley 65. The timing belt 67 transmits a rotation of the motor side synchronous pulley 65 to the roller side synchronous pulley 66. The roller side synchronous pulley 66 drives and rotates the driving roller 62. The cross belt 61 transmits the rotation of the driving roller 62 to the driven roller 63. Thus, the cross belt 61 is driven in the horizontal direction when a person faces the first conveying direction D1, and conveys the article P set on the setting surface A, in the first transferring direction D2A and the second transferring direction D2B. The driving roller 62, the driven roller 63, the motor side synchronous pulley 65, the motor 68, the roller side synchronous pulley 66, and the timing belt 67 constitute an actuator that drives the crossed belt 61.

As illustrated in FIG. 3, the battery 44 is provided to the chassis unit 41. The battery 44 stores power supplied from the non-contact power feeder 34.

The communication section 46 is provided to the chassis unit 41. The communication section 46 transmits and receives various pieces of information by way of non-contact communication (e.g. infrared communication or wireless communication) between the control device 16 and the cell controller 47. The communication section 46 operates by using power supplied from the battery 44.

The cell controller 47 is, for example, a PLC (Programmable Logic Controller) or a control board. The cell controller 47 is fixed to the chassis unit 41. The cell controller 47 operates by using power supplied from the battery 44. The cell controller 47 controls driving of the motor 68 according to a control instruction outputted from the control device 16.

As illustrated in FIG. 1, the loading section 13 loads the article P to each of the plurality of conveyer cells 12. The loading section 13 is arranged, for example, outside the conveying path 11, i.e., at a right side of the conveying path 11 (a first transferring direction D2A side of the conveyer cells 12) when a person faces the first conveying direction D1 in case where the first conveying direction D1 is a counterclockwise conveying direction.

Figure 5:
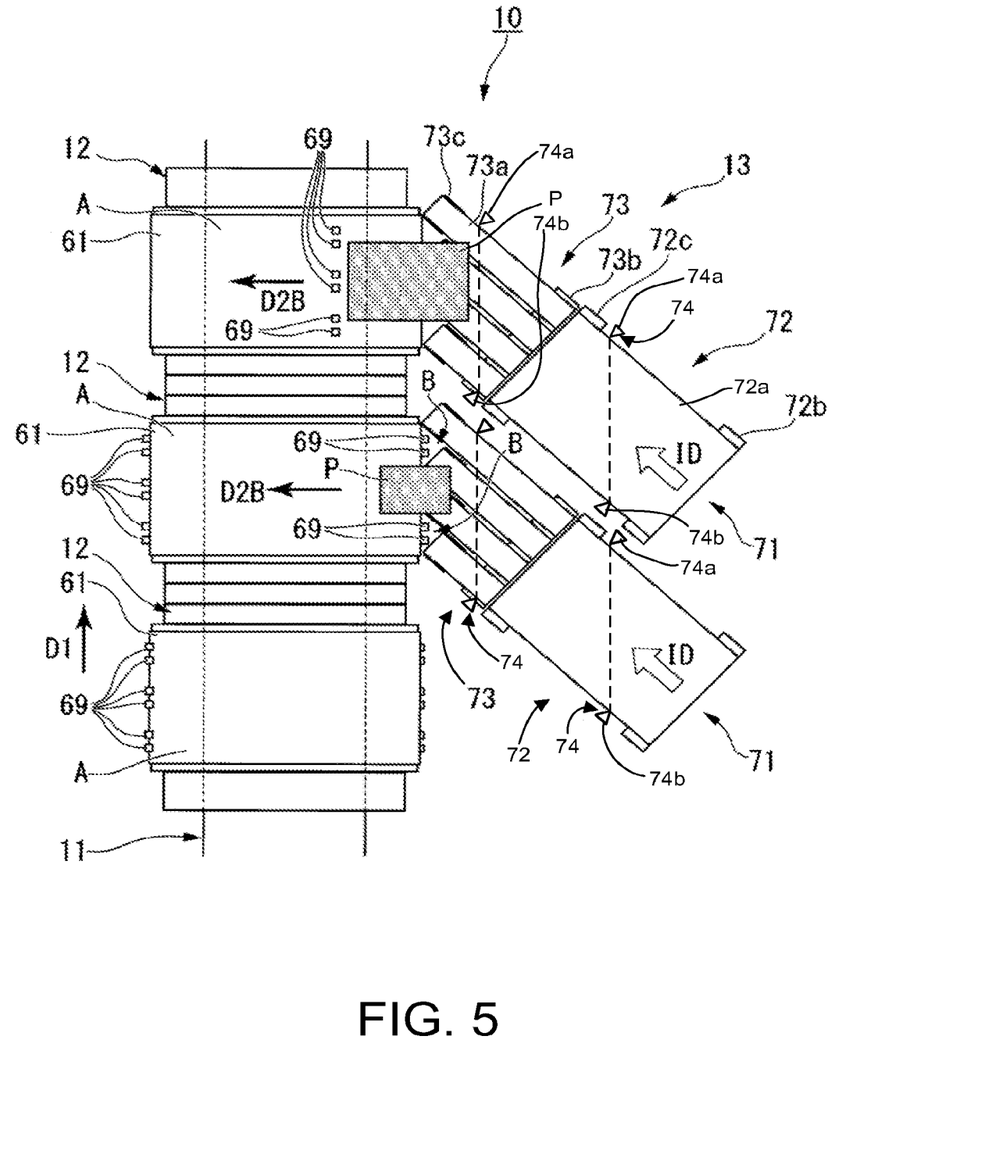
FIG. 5 is a plan view schematically illustrating a configuration of part of a loading section and a conveyer cell of the article sorting apparatus according to the embodiment.

The loading section 13 includes at least one injector 71. As illustrated in FIG. 5, each injector 71 includes a first conveyer 72 and a second conveyer 73 which are aligned in a third conveying direction ID which intersects the first conveying direction D1 of the conveying path 11 at a predetermined acute angle.

The first conveyer 72 includes a first conveying belt 72a which is driven in the third conveying direction ID, and a first driving roller 72b and a first driven roller 72c between which the first conveying belt 72a is stretched. The first driving roller 72b and the first driven roller 72c are arranged in parallel to each other at predetermined interval in the third conveying direction ID. The first conveying belt 72a is rotated by the rotation driving force of the first driving roller 72b to drive and rotate the first driven roller 72c.

The second conveyer 73 includes a plurality of second conveying belts 73a which is driven in the third conveying direction ID. The width of each second conveying belt 73a (a belt width in a direction orthogonal to the third conveying direction ID) is formed narrower than the width of the first conveying belt 72a. The plurality of second conveying belts 73a is aligned at predetermined intervals in a width direction (i.e., a direction orthogonal to the third conveying direction ID). Each second conveying belt 73a is stretched between the second driving roller 73b and the second driven roller 73c arranged in parallel to each other at predetermined interval in the third conveying direction ID. Each second conveying belt 73a is rotated by a rotation driving force of the second driving roller 73b to drive and rotate the second driven roller 73c.

Thus, each injector 71 sequentially transfers the article P from the first conveyer 72 and the second conveyer 73 to the desired conveyer cell 12 in the third conveying direction ID which intersects the first conveying direction D1 of the conveying path 11 at a predetermined acute angle. When the article P is transferred from each injector 71 to the conveyer cell 12, each second conveying belt 73a of the second conveyer 73 and the cross belt 61 of each conveyer cell 12 are arranged at predetermined interval. Thus, each second conveying belt 73a and the cross belt 61 form a space region B which allows the projecting portion 69 to pass when the cross belt 61 is driven.

Each injector 71 includes at least one article position sensor 74. Each article position sensor 74 is arranged in the first conveyer 72 or the second conveyer 73 to measure a length of the article P in the second transferring direction D2B. Each article position sensor 74 includes a light emitting device 74a and a light receiving device 74b which are arranged to oppose to each other such that illumination light from the light emitting device 74a crosses the first conveyer 72 or the second conveyer 73 in a direction parallel to the first conveying direction D1. The illumination light outputted from the light emitting device 74a is received by the light receiving device 74b when there is not the article P on the optical axis. Each article position sensor 74 outputs an on signal when there is the article P on the optical axis of the illumination light outputted from the light emitting device 74a and reception of the illumination light at the light receiving device 74b is interrupted. Each article position sensor 74 outputs an off signal when there is no article P on the optical axis of the illumination light outputted from the light emitting device 74a and reception of the illumination light at the light receiving device 74b continues. When an upper surface shape of the article P is rectangular when the article P is seen from the above of the article P, the article P is set on the first conveying belt 72 such that a direction of shorter sides of a rectangle is parallel to the first conveying direction D1. Hence, the article position sensor 74 measures a length of the article P in a long side direction of the rectangle as the size of the article P.

The information obtaining device 14 includes, for example, an optical character recognition (OCR) device or a code reading device which reads a one-dimensional code or a two-dimensional code. The information obtaining device 14 obtains information allocated to the article P loaded to each conveyer cell 12, and transmits the obtained information to the control device 16.

The sorting section 15 receives the article P delivered from each of a plurality of conveyer cells 12. As illustrated in FIG. 1, the sorting section 15 includes a plurality of shooters 81 aligned along the first conveying direction D1 of the conveying path 11. A different sorting destination is allocated to each shooter 81. The sorting section 15 includes a plurality of shooters 81, for example, at an inside and an outside of the conveying path 11, i.e., at a left side and a right side of the conveying path 11 when a person faces the first conveying direction D1 in case where the first conveying direction D1 is the counterclockwise conveying direction when a paper sheet is seen from the above in FIG. 1.

The control device 16 controls each conveyer cell 12 to accelerate, decelerate or stop (e.g. make emergency stop of) each conveyer cell 12 by controlling a state of a current flowing in the electromagnetic coil 32 of the linear synchronous motor 31. The control device 16 stores layout information of the article sorting apparatus 10 in advance (e.g. curves of the conveying path 11, respective positions of the loading section 13 and the sorting section 15, curve directions and curvature radii). The control device 16 manages information of the article P (e.g. a size and address information of the article P) obtained by the information obtaining device 14.

The control device 16 communicates with each of the loading section 13, the information obtaining device 14 and the sorting section 15 through cables or by radio, and transmits and receives various pieces of information. The control device 16 transmits a control instruction to control each operation of the loading section 13, the information obtaining device 14 and the sorting section 15. The control device 16 transmits and receives various pieces of information by way of non-contact communication with the cell controller 47 of each of the plurality of conveyer cells 12. The control device 16 transmits to each cell controller 47 the control instruction for instructing a control operation of each cell controller 47.

The control device 16 synchronizes an operation of driving the cross belt 61 by the motor 68 of each conveyer cell 12 to accelerate or decelerate or stopping the cross belt 61, with an operation of transferring the article P by each injector 71 such that the article P is passed (transferred) from each injector 71 of the loading section 13 to each conveyer cell 12. The control device 16 transmits to the cell controller 47 of each conveyer cell 12 a control instruction of instructing a timing at which the motor 68 of each conveyer cell 12 drives the cross belt 61 to accelerate or decelerate and stops the cross belt 61. The cell controller 47 of each conveyer cell 12 controls the cross belt 61 to receive and hold the article P by controlling the motor 68 to drive to accelerate or decelerate the cross belt 61 or stop the cross belt 61 at a timing specified by the control device 16. Thus, the loading section 13 transfers the article P to the setting surface A of each conveyer cell 12 from each injector 71.

The cell controller 47 of each conveyer cell 12 controls the cross belt 61 to drive according to a control instruction from the control device 16 such that the projecting portion 69 contacts the lower surface of the article P when the article P is transferred from each injector 71 of the loading section 13 to the setting surface A. The cell controller 47 detects a center position of the article P in the second conveying direction based on an on/off signal outputted from the article position sensor 74 of the loading section 13. The cell controller 47 controls the motor 68 to drive the cross belt 61 such that, when a size of the article P is less than a predetermined size, the projecting portion 69 contacts the lower surface of the article P closer to a rear side (injector 71 side) than the center position of the article P in the second conveying direction. The cell controller 47 causes the projecting portion 69 to contact the lower surface of the article P closer to the rear side (injector 71 side) than the center position of the article P in the second conveying direction when, for example, the length of the article P is less than a predetermined threshold. The predetermined threshold of the length of the article P in the second conveying direction is set based on each diameter of the rollers of the conveyer cells 12 and the rollers of the injectors 71 which face each other when the article P is passed from the injector 71 to the conveyer cell 12. For example, a larger diameter of the diameter of the driving roller 62 of the conveyer cells 12 and the diameters of the second driven rollers 73c of the injectors 71 is set as the predetermined threshold.

The control device 16 obtains from the information obtaining device 14 information of the article P loaded on the setting surface A of each conveyer cell 12 by the loading section 13. The control device 16 learns a sorting destination of the article P according to the information of the article P received from the information obtaining device 14, and selects the shooter 81 corresponding to the learned sorting destination from a plurality of shooters 81 of the sorting section 15. The control device 16 sets a driving timing at which the cross belt 61 is driven by the motor 68 of each conveyer cell 12 (i.e. a timing at which the article P is put into the selected shooter 81) such that the article P is put from each conveyer cell 12 to the selected shooter 81. The control device 16 transmits a control instruction for instructing the driving timing at which the cross belt 61 is driven by the motor 68 of each conveyer cell 12, to the cell controller 47 of each conveyer cell 12. The cell controller 47 of each conveyer cell 12 controls the cross belt 61 to put the article P by driving the motor 68 at a driving timing specified by the control device 16. Thus, each conveyer cell 12 sorts the article P to the shooter 81 of the sorting section 15 according to the sorting destination corresponding to information of the article P.

Figure 6:
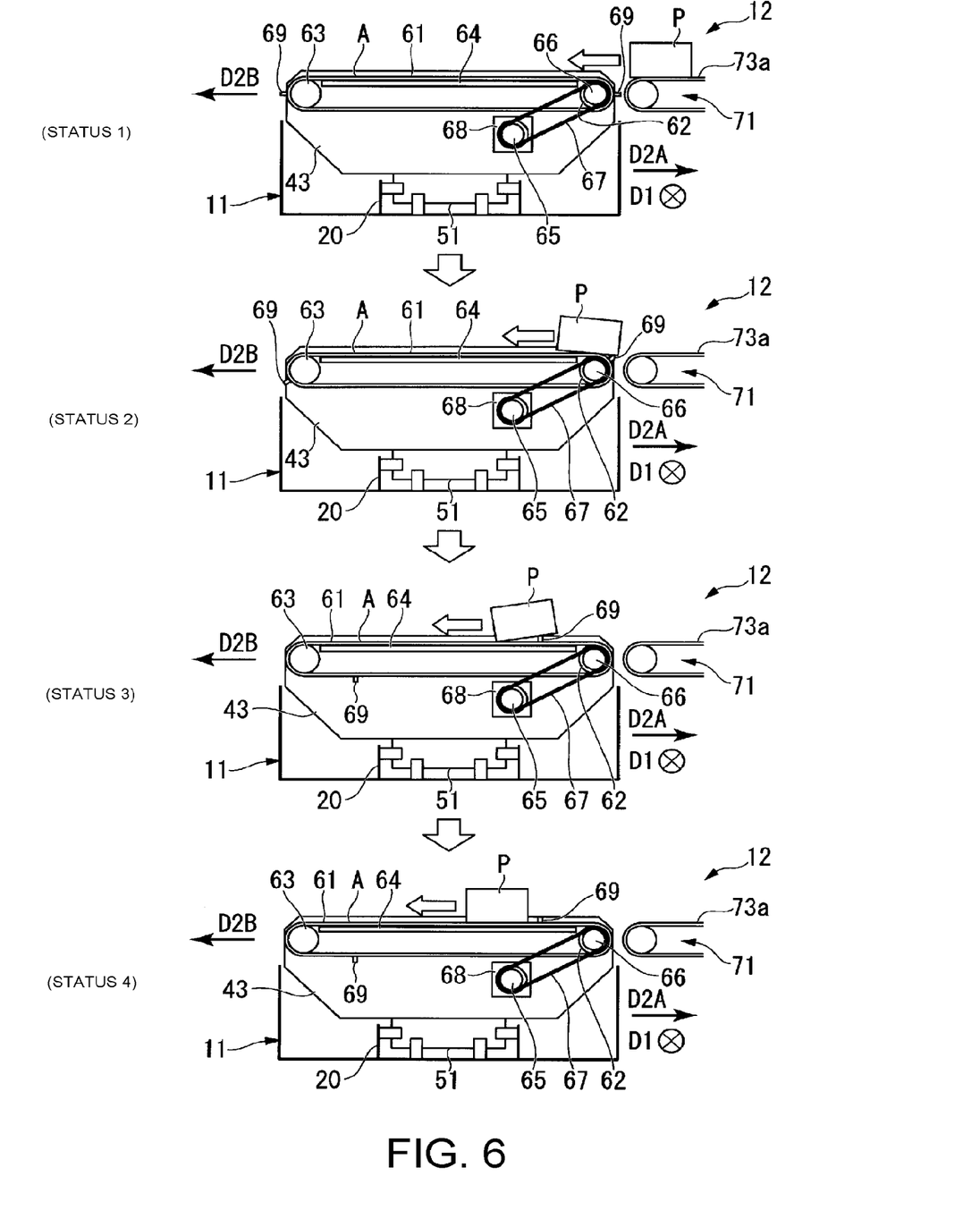
FIG. 6 is a side view illustrating an example of an operation of the article sorting apparatus according to the embodiment.

An operation of transferring the article P from the loading section 13 to each conveyer cell 12 and an operation of delivering the article P from each conveyer cell 12 to the shooter 81 of the sorting section 15 among operations of the article sorting apparatus 10 according to the above embodiment will be described with reference to FIGS. 5 and 6.

In addition, each conveyer cell 12 moves along the conveying path 11 at a certain conveying speed V (e.g. a predetermined speed in a range of 2.0 to 4.0 m/s).

When the conveyer cell 12 on which the article P is not loaded enters the loading section 13, the control device 16 instructs the loading section 13 to pass the article P to the conveyer cell 12. The control device 16 instructs the cell controller 47 of the conveyer cell 12 to control the motor 68 to drive the cross belt 61 in synchronization with that the injector 71 of the loading section 13 conveys the article P. The control device 16 instructs the cell controller 47 to attract the article P from the injector 71 to the setting surface A of the cross belt 61, and move the article P to a predetermined position (e.g. a center position) on the setting surface A.

The loading section 13 loads the article P to the conveyer cell 12 according to the control instruction from the control device 16. The injector 71 of the loading section 13 conveys the article P to the conveyer cell 12 by driving the first conveying belt 72a and the plurality of second conveying belts 73a. The injector 71 adjusts a component of a conveying speed of the article P in the first conveying direction D1 to the same speed as the speed of the conveyer cell 12 in the first conveying direction D1.

The cell controller 47 of the conveyer cell 12 attracts the article P from the injector 71 to the setting surface A of the cross belt 61 according to a control instruction from the control device 16. The cell controller 47 adjusts a driving speed of the setting surface A of the cross belt 61 to the same speed as a component of the conveying speed at which the injector 71 conveys the article P in the second conveying direction. The loading section 13 is arranged at a right side of the conveying path 11 (the first transferring direction D2A side of the conveyer cell 12) when a person faces the first conveying direction D1. Thus, the cell controller 47 drives the setting surface A of the cross belt 61 in the second transferring direction D2B, and adjusts the driving speed of the cross belt 61 to the same speed as the component of the conveying speed at which the injector 71 conveys the article P in the second transferring direction D2B.

The cell controller 47 of the conveyer cell 12 causes the motor 68 to drive the cross belt 61 and arranges the projecting portion 69 to a predetermined standby position before attracting the article P from the injector 71 onto the setting surface A. The cell controller 47 stores, for example, predetermined data indicating a correspondence between a rotation angle of the motor 68 and a position of the projecting portion 69. The cell controller 47 learns the position of the projecting portion 69 according to an instruction value of a rotation angle of the motor 68 or a rotation angle of the motor 68 detected by a rotation sensor (not illustrated) by referring to the predetermined data. The cell controller 47 switches the predetermined standby position according to whether or not the size of the article P is the predetermined size or more. The cell controller 47 sets an article contact position as a predetermined standby position as illustrated as state 1 in FIG. 6 when, for example, the length of the article P in the second conveying direction is less than a predetermined threshold. The article contact position is set as a standby position of the projecting portion 69 such that, when the article P is attracted onto the setting surface A from the plurality of second conveying belts 73a by driving the cross belt 61, the projecting portion 69 contacts the lower surface of the article P closer to the rear side (injector 71 side) than the center position of the article P in the second conveying direction. The cell controller 47 sets an article non-contact position as a predetermined standby position when, for example, the length of the article P in the second conveying direction is a predetermined threshold or more. The article non-contact position is set as a standby position of the projecting portion 69 such that, when the article P is attracted from the plurality of second conveying belts 73a onto the setting surface A by driving the cross belt 61, the projecting portion 69 does not contact the lower surface of the article P.

Next, the cell controller 47 drives the cross belt 61 in synchronization with that the first conveying belt 72a and the plurality of second conveying belts 73a convey the article P to attract the article P from the plurality of second conveying belts 73a onto the setting surface A. When, for example, the length of the article P in the second conveying direction is less than the predetermined threshold, as illustrated as state 2 in FIG. 6, while the article P is attracted onto the setting surface A, the projecting portion 69 supports the article P to push up the lower surface of the article P closer to the rear side (injector 71 side) than the center position of the article P in the second conveying direction. Thus, it is possible to reliably pass the article P from the injector 71 to the conveyer cell 12 and prevent the articles P from staying between the plurality of second conveying belts 73a and the cross belt 61. The cell controller 47 attracts the article P from the plurality of second conveying belts 73a onto the setting surface A without allowing the projecting portion 69 to contact the lower surface of the article P when, for example, the length of the article P in the second conveying direction is the predetermined threshold or more.

When, for example, the length of the article P in the second conveying direction is less than the predetermined threshold, the cell controller 47 separates the projecting portion 69 from the lower surface of the article P when necessary after the entire article P is loaded onto the setting surface A. That is, as illustrated in FIG. 6, the cell controller 47 changes a positional relationship between the article P and the projecting portion 69 from state 3 to state 4. The cell controller 47 causes the projecting portion 69 to stop contacting the lower surface of the article P by an inertia of the article P and causes the entire lower surface of the article P to contact the setting surface A by decelerating, stopping or driving in an opposite direction the cross belt 61 which is being driven.

In a state like the state 3 that the article P is loaded and inclines between the projection part 69 and the setting surface A, the risk of falling down of the article P to the second transfer direction D2B increases. That is, the force working on the article P to the second transferring direction D2B by the centrifugal force in a curve or the inertia force of the article P at the time of operation, or vibration of the conveyor cell 12 may fall the article P. However, the risk can be sharply reduced by contacting the whole lower surface of the article P to the setting surface A. Moreover, when sorting the article to the second transferring direction D2B in the state 3, the problem of becoming easy to be caught in a gap between the shooter and the conveyor cell 12 is assumed. However, its risk can also be reduced by contacting the whole lower surface of the article P to the setting surface A.

The cell controller 47 moves the article P to a predetermined position on the setting surface A (e.g. the center position in the second conveying direction) after the entire article P is loaded to the setting surface A.

In addition, in case where the loading section 13 is arranged at the left side of the conveying path 11 (the second transferring direction D2B side of the conveyer cell 12) when a person faces the first conveying direction D1, the cell controller 47 drives the setting surface A of the cross belt 61 in the first transferring direction D2A to attract the article P onto the setting surface A. Thus, the cell controller 47 adjusts a driving speed of the cross belt 61 in the first transferring direction D2A to the same speed as the component of the conveying speed at which the injector 71 conveys the article P in the first transferring direction D2A.

When the conveyer cell 12 on which the article P is loaded enters the sorting section 15 having the shooter 81 corresponding to a sorting destination of the article P, the control device 16 instructs the cell controller 47 of the conveyer cell 12 to deliver the article P to the shooter 81. The cell controller 47 of the conveyer cell 12 drives the cross belt 61 according to a control instruction from the control device 16, and delivers the article P from the setting surface A of the cross belt 61 to the shooter 81.

Figure 8:
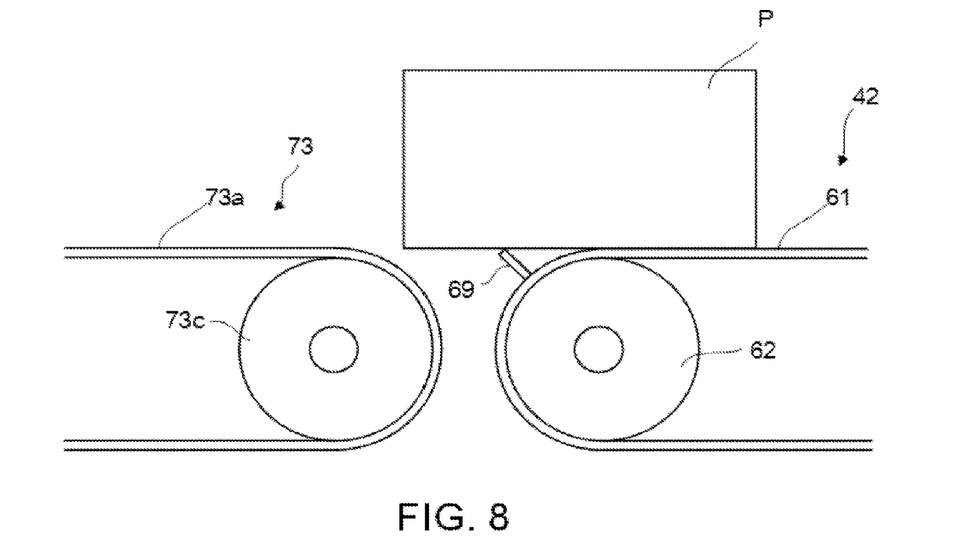
FIG. 8 is a view for explaining a driving roller of a cross belt mechanism, a projecting portion of a cross belt and a second driven roller of a second conveyer of the loading section of the article sorting apparatus according to the embodiment.

In this regard, the driving roller 62 of the cross belt mechanism 42, the projecting portion 69 of the cross belt and the second driven roller 73c of the second conveyer 73 of the loading section 13 of the conveyer cell 12 will be described with reference to FIG. 8. In an example of the embodiment, a diameter of the driving roller 62 is 50 mm, a diameter of the second driven roller 73c is 50 mm, a distance between the driving roller 62 and the second driving roller 72 is 20 mm, a thickness of the cross belt of the cross belt mechanism 42 is 3 mm, a thickness of the second conveying belt 73a is 3 mm. The projecting portion 69 preferably has the thickness (a length in the length direction of the cross belt 61) of 2 mm, and the height of 10 mm.

Preferably, the diameter of the driving roller 62 is 40 mm to 80 mm and the diameter of the second driven roller 73 is 40 mm to 80 mm, a distance between the driving roller 62 and the second driven roller 73 is 10 mm to 50 mm, a thickness of the cross belt of the cross belt mechanism 42 is 2 mm to 4 mm, and the thickness of the second conveying belt 73a is 2 mm to 4 mm. The projecting portion 69 preferably has the length of 5 mm to 30 mm in the length direction of the cross belt 61, and the height of 1.5 mm to 10 mm. Particularly, the height of the projecting portion 69 (a size in the thickness direction of the belt) is about 10% to 30% of (diameter of driving roller 62+ thickness of cross belt 61×2), and the thickness of the projecting portion 69 (a size in a longitudinal direction of the belt) is about 15% to 35% of the height.

According to the above-described embodiment, the control device 16 which controls the cross belt 61 to drive such that, when the article P is transferred from the loading section 13 to the setting surface A of the cross belt 61 of the conveyer cell 12, the projecting portion 69 contacts the lower surface of the article P is provided. Consequently, it is possible to adequately convey and sort article.

Further, the control device 16 which causes the projecting portion 69 to contact the lower surface of the article P closer to the rear side (injector 71 side) than the center position of the article P in the second conveying direction is provided.

Consequently, it is possible to reliably pass the article, and prevent the article P from staying between the plurality of conveying belts 73a and the cross belt 61. Furthermore, the control device 16 which, when the size of the article P is a predetermined size or more, does not allow the projecting portion 69 to contact the lower surface of the article P is provided. Consequently, it is possible to prevent an excessive load from applying to the projecting portion 69, and prevent an exchange frequency from increasing due to wearing of the projecting portion 69.

Further, a larger diameter among diameters of the rollers of the conveyer cells 12 and the rollers of the injectors 71 which face each other when the article P is passed from the injector 71 to the conveyer cell 12 is set as a predetermined threshold of the length of the article P in the second conveying direction. Consequently, it is possible to reliably transfer the article P from the injector 71 to the conveyer cell 12, and prevent the article P from staying or prevent the projecting portion 69 from being worn away.

The plurality of second conveying belts 73a aligned in a direction orthogonal to the third conveying direction ID is provided. Consequently, even when the third conveying direction ID intersects the first conveying direction D1 at a predetermined acute angle, it is possible to adjust interval between each of the second conveying belts 73a and the cross belt 61. Thus, it is possible to make each second conveying belt 73a and the cross belt 61 closer to each other to minimize the interval between each second conveying belt 73a and the cross belt 61. Further, by providing the projecting portion 69 such that a gap formed between each second conveying belt 73a and the cross belt 61 passes through the projecting portion 69, it is possible to make each second conveying belt 73a and the cross belt 61 close to each other while securing a region in which the projecting portion 69 passes. Each second conveying belt 73a and the cross belt 61 contribute to more reliable transfer of the article P from the second conveying belt 73a to the cross belt 61.

A modification will be described below.

In the above embodiment, a cell controller 47 refers to predetermined data stored in advance (e.g. data indicating a correspondence between a rotation angle of a motor 68 and a position of a projecting portion 69), and arranges the projecting portion 69 at a predetermined standby position by driving the motor 68. However, the present invention is not limited to this.

Figure 7:
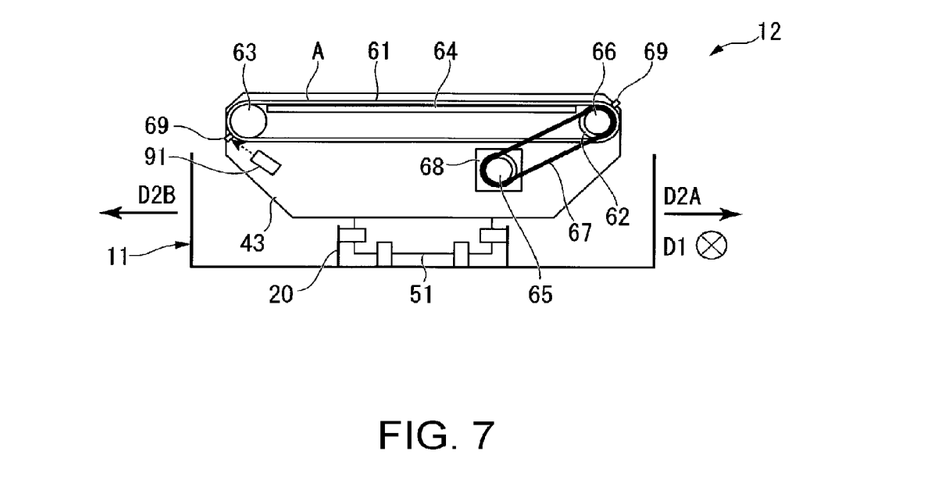
FIG. 7 is a sectional view schematically illustrating a configuration of part of an article sorting apparatus according to a modification of the embodiment.

The cell controller 47 may arrange the projecting portion 69 at a predetermined standby position by driving the motor 68 according to a signal outputted from a position sensor 91 which detects a position of the projecting portion 69. As illustrated in FIG. 7, the position sensor 91 is provided to each conveyer cell 12. The position sensor 91 is, for example, a transmissive, reflective or proximity optical sensor. The position sensor 91 includes, for example, a light emitting device and a light receiving device which have predetermined optical axes. The position sensor 91 outputs an on signal when there is the projecting portion 69 on the optical axis of illumination light outputted from the light emitting device, and the light receiving device continues receiving reflected light obtained when illumination light is reflected by the projecting portion 69. The position sensor 91 outputs an off signal when there is not the projecting portion 69 on the optical axis of illumination light outputted from the light emitting device and reception of reflected light at the light receiving device is interrupted.

According to this modification, the cell controller 47 which recognizes the position of the projecting portion 69 according to a signal outputted from the position sensor 91 is provided. Consequently, the motor 68 can accurately drive the cross belt 61 when the projecting portion 69 is caused to contact the lower surface of an article P.

In the above embodiment, the control device 16 sets whether or not to cause the projecting portion 69 to contact the lower surface of the article P according to whether or not a size of the article P is less than a predetermined size. However, the present invention is not limited to this. The control device 16 may set whether or not to cause the projecting portion 69 to contact the lower surface of the article P according to a weight of the article P instead of the size of the article P or in addition to the size of the article P.

In the above embodiment, by covering a surface of the projecting portion 69 with a material of a high friction coefficient or making the projecting portion 69 of a material of a high friction coefficient, stability of a contact state of the projecting portion 69 with respect to the lower surface of the article P may be improved.

In the above embodiment, the cell controller 47 separates the projecting portion 69 from the lower surface of the article P after the entire article P is loaded to a setting surface A. However, the present invention is not limited to this, and a state where the projecting portion 69 contacts the lower surface of the article P may be maintained.

In the above embodiment, the conveying path 11 and the plurality of conveyer cells 12 include a linear synchronous motor 31. However, the present invention is not limited to this, and the conveying path 11 and the plurality of conveyer cells 12 may include a linear induction motor.

Further, each conveyer cell 12 includes a driving wheel and a motor which drives and rotates the driving wheel instead of the linear synchronous motor 31 yet may travel on a conveying path 11 by using a motor as a travel driving source.

Furthermore, each conveyer cell 12 may be conveyed on the conveying path 11 by a transmission mechanism which mechanically transmits a driving force instead of the linear synchronous motor 31. For example, a flat plate may be vertically hang downward from a chassis 51 of a chassis unit 41, and end portions of this flat plate may be sandwiched from both sides in a thickness direction by a pair of rollers which are driven and rotated by a motor to apply a driving force in a first conveying direction D1.

In the above embodiment, a non-contact power feeder 34 is provided over an entire region of the conveying path 11. However, the present invention is not limited to this, and the non-contact power feeder 34 may be provided to part of the conveying path 11.

The non-contact power feeder 34 may be provided near each of at least a loading section 13, a sorting section 15, a first curve 21 and a second curve 22 (e.g. near an exit of each of the first curve 21 and the second curve 22).

In the above embodiment, the non-contact power feeder 34 supplies power from the conveying path 11 to each conveyer cell 12 by way of electromagnetic induction without contacting each conveyer cell 12. However, the present invention is not limited to this.

The non-contact power feeder 34 may supply power from the conveying path 11 to each conveyer cell 12 by way of transmission and reception of radio waves, magnetic resonance or electric field coupling without contacting each conveyer cell 12.

In the above embodiment, the conveyer cells 12 which are adjacent in the first conveying direction D1 are connected by mutual connecting mechanisms 53. However, the present invention is not limited to this, and the plurality of conveyer cells 12 may be independently separated from each other.

In the above embodiment, the motor 68 is a servomotor. However, the present invention is not limited to this, and the motor 68 may be, for example, a brushless motor or a stepping motor.

In the above embodiment, a cross belt mechanism 42 may include a tension adjusting mechanism which adjusts a tension of the cross belt 61 by adjusting an interval between a driving roller 62 and a driven roller 63.

Further, the cross belt mechanism 42 may include a tension roller which adjusts the tension of the cross belt 61 in addition to the driving roller 62 and the driven roller 63.

In the above embodiment, each shooter 81 of the sorting section 15 may include a conveyer such as a belt conveyer which operates to attract the article P delivered from the cross belt 61 of each conveyer 12.

In the above-explained embodiment, the control device 16 which controls the cross belt 61 to drive such that the projecting portion 69 contacts the lower surface of the article P when the loading section 13 transfers the article P to the setting surface A is provided. Consequently, the loading section 13 can reliably transfer the article P to the conveyer cell 12 and, as a result, it is possible to adequately convey and sort the article P.

Further, the control device 16 which causes the projecting portion 69 to contact the lower surface of the article P closer to a rear side than the center position of the article P in the second conveying direction is provided. The loading section 13 can reliably transfer the article P to the conveyer cell 12 and, as a result, it is possible to prevent the article P from staying between a plurality of second conveying belts 73*a* and the cross belt 61.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An article sorting apparatus comprising:
   a conveying path;
   a conveyer cell which includes a belt which forms a setting surface on which an article is set, a projecting portion which projects from a surface of the belt, a plurality of rollers around which the belt is wound, and an actuator which drives the belt, and which moves on the conveying path in a first conveying direction and conveys the article set on the setting surface in a second conveying direction orthogonal to the first conveying direction of the conveying path;
   a loading section which transfers the article to the conveyer cell and which includes a conveying belt which conveys the article and a plurality of conveying rollers around which the conveying belt is wound;
   a sorting section which receives the article delivered from the conveyer cell; and
   a control device which, when a size of the article is smaller than a predetermined size and when the loading section transfers the article to the setting surface, controls the actuator to drive the belt such that the projecting portion passes a space between the roller of the conveyer cell and the conveying roller of the loading section which face mutually and contacts a lower surface of the article.

2. The article sorting apparatus according to claim 1, wherein the control device is configured to control the actuator to drive the belt such that the projecting portion contacts a position of the lower surface of the article closer to a rear side than a center position of the article in the second conveying direction.

3. The article sorting apparatus according to claim 1, wherein the control device is configured to control the actuator to drive the belt such that the projecting portion does not contact the lower surface of the article when the size of the article is the predetermined size or more.

4. The article sorting apparatus according to claim 3,
   wherein the predetermined size is a predetermined threshold of a length of the article in the second conveying direction, and
   wherein the predetermined threshold is equal to a larger diameter out of a diameter of each of the roller of the conveyer cell and the conveying rollers of the loading section which face each other when an article P is transferred to the conveyer cell from the loading section.

5. The article sorting apparatus according to claim 4, wherein
   a conveying direction in which the conveying belt conveys the article intersects the first conveying direction of the conveying path at an acute angle, and
   the conveying belt includes a plurality of conveying belts aligned at a predetermined interval in a direction orthogonal to the conveying direction of the article.

6. The article sorting apparatus according to claim 5, wherein the projecting portion passes between the belt and each of the plurality of conveying belts when the belt is driven.

7. The article sorting apparatus according to claim 1, further comprising a position sensor which detects a position of the projecting portion,
   wherein the control device controls the actuator to drive the belt based on the position of the projecting portion detected by the position sensor.

8. The article sorting apparatus according to claim 1, wherein the projecting portion projects from the surface of the belt 1.5 mm to 10 mm from a surface of the belt.

9. The article sorting apparatus according to claim 1, wherein a length of the projecting portion in the second conveying direction of the belt is 5 mm to 30 mm.

10. The article sorting apparatus according to claim 1, wherein the projecting portion is provided in a direction orthogonal to the second conveying direction.

11. An article sorting apparatus comprising:
    a conveying path;
    a conveyer cell which includes a belt which forms a setting surface on which an article is set, a projecting portion which projects from a surface of the belt, a plurality of rollers around which the belt is wound, and an actuator which drives the belt, and which moves on the conveying path in a first conveying direction and conveys the article set on the setting surface in a second conveying direction orthogonal to the first conveying direction of the conveying path;
    a loading section which transfers the article to the conveyer cell and which includes a conveying belt which conveys the article and a plurality of conveying rollers around which the conveying belt is wound, a sorting section which receives the article delivered from the conveyer cell; and a control device which, when a size of the article is smaller than a predetermined size and when the loading section transfers the article to the setting surface, controls the actuator to drive the belt such that the projecting portion contacts a lower surface of the article, wherein the projecting portion includes a plurality of protrusions discontinuously provided along a direction orthogonal to the second conveying direction, and wherein the plurality of protrusions is provided at portions except for portions corresponding to a region in which the belt and the conveying belt are close.

12. An article sorting apparatus comprising:

a conveying path;

a conveyer cell which includes a belt which forms a setting surface on which an article is set, a projecting portion which projects from a surface of the belt, a plurality of rollers around which the belt is wound, and an actuator which drives the belt, and which moves on the conveying path in a first conveying direction and conveys the article set on the setting surface in a second conveying direction orthogonal to the first conveying direction of the conveying path;

a loading section which transfers the article to the conveyer cell and which includes a conveying belt which conveys the article and a plurality of conveying rollers around which the conveying belt is wound;

a sorting section which receives the article delivered from the conveyer cell; and a control device which, when a weight of the article is lighter than a predetermined weight and when the loading section transfers the article to the setting surface, controls the actuator to drive the belt such that the projecting portion passes a space between the roller of the conveyer cell and the conveying roller of the loading section and contacts a lower surface of the article.

* * * * *